United States Patent [19]

Genender

[11] Patent Number: 4,581,490

[45] Date of Patent: Apr. 8, 1986

[54] WALL TELEPHONE ASSEMBLY

[76] Inventor: Richard Genender, 2314 Lincoln Park W., #18N, Chicago, Ill. 60614

[21] Appl. No.: 564,402

[22] Filed: Dec. 22, 1983

[51] Int. Cl.⁴ .......................................... H04M 1/02
[52] U.S. Cl. .......................... 179/100 R; 179/146 R; 179/159; 179/178
[58] Field of Search ............... 179/100 R, 103, 121 D, 179/146 R, 178, 179, 159, 167; 307/400

[56] References Cited

U.S. PATENT DOCUMENTS

| | | | |
|---|---|---|---|
| 1,575,743 | 3/1926 | Driscoll | 179/100 R |
| 2,322,851 | 6/1943 | Kalb | 179/159 |
| 2,485,278 | 10/1949 | Gilman et al. | 179/121 R |
| 3,546,397 | 12/1970 | Laing | 179/100 R |
| 4,018,998 | 4/1977 | Wegner | 179/103 |
| 4,263,484 | 4/1981 | Hisatsune et al. | 179/111 E |
| 4,319,095 | 3/1982 | Cogan | 179/179 |
| 4,395,591 | 7/1983 | Koczkos | 179/100 R |

FOREIGN PATENT DOCUMENTS

| | | | |
|---|---|---|---|
| 1214735 | 4/1966 | Fed. Rep. of Germany | 179/159 |
| 0674754 | 11/1964 | Italy | 179/146 R |
| 0024014 | 2/1977 | Japan | 179/159 |
| 1144485 | 3/1969 | United Kingdom | 179/159 |
| 2064263 | 6/1981 | United Kingdom | 179/103 |

OTHER PUBLICATIONS

Foley's College Physics, J. L. Galhart, Maple Press, York, Pa., 1947, pp. 313–327.

Primary Examiner—Gene Z. Rubinson
Assistant Examiner—R. Vaas
Attorney, Agent, or Firm—Laff, Whitesel, Conte & Saret

[57] ABSTRACT

A wall-mounted telephone assembly is described in which reentrant surfaces are formed on both the handset and the wall-mounted base unit to increase the difficulty of dislodging the handset from its hung-up position upon the base unit. In addition the handset and base unit are magnetically attracted to each other to further increase the difficulty of dislodging it, and also for the purpose of keeping the hang-up switch in the on-hook condition when the handset is hung up. The magnetically permeable structure incorporated in the handset for this purpose also serves the purposes of acoustically isolating the microphone from the interior of the handset housing, and of focusing the desired acoustic signal upon the microphone, thus improving the acoustic performance of the telephone.

6 Claims, 4 Drawing Figures

WALL TELEPHONE ASSEMBLY

This invention relates generally to telephone apparatus, and particularly concerns a wall-mounted phone assembly which is mechanically and acoustically superior to previous designs.

BACKGROUND AND PRIOR ART

The advent of electronic telephone circuitry has promoted the widespread use of condensor microphones in the mouthpiece portion of modern telephone handsets. While this type of microphone has electrical advantages, it is subject to certain acoustic drawbacks. The condensor type of microphone is more sensitive than the type of microphone which prevailed earlier, and as a result it is capable of detecting acoustic resonances in the interior of the handset housing. This imparts a hollow, echo-like quality to the sound reproduced at the other end of the telephone link. The great sensitivity of such microphones also causes distracting background noises to be transmitted at amplitudes great enough to be noticeable.

Another problem often encountered in the telephone art is the tendency of wall telephone handsets to be easily dislodged from their wall-mounted base units. For example, household pets or small children passing by such a telephone installation are prone to collide with the dangling handset cord, and thereby cause the handset to be dislodged from its resting place. This connects the set to the telephone line at an inappropriate time (perhaps causing an important incoming call to encounter a busy signal), and also risks damage to the handset and any other object which it may strike as it falls.

Another problem posed by wall-mounted telephone assemblies is the difficulty of keeping the hang-up switch actuator button depressed. Table sets can rely on gravity, but the vertical attitude of wall-mounted apparatus deprives it of any such assistance. Consequently, it is difficult to design a wall phone in a way which assures that the handset and wall-mounted base unit will be pressed together with sufficient force to keep the hang-up switch in the on-hook position. Even if a wall-mounted telephone assembly can be designed so that the hang-up switch is in the on-hook condition whenever the handset is hung in precisely the right position relative to the wall-mounted base unit, there is always the risk that it will not be placed so precisely, or that it will later be partially dislodged, resulting in an unintentional off-hook condition.

BRIEF SUMMARY OF THE INVENTION

These difficulties are all alleviated by the present invention, which provides a telephone assembly including a handset which comprises a housing defining an interior, and entry means to admit sound to the housing interior. A microphone is mounted within the housing interior in position to detect sound entering therein, and sound-channeling means is provided to form a substantially closed channel for guiding sound from said entry means to the microphone. In this way the interior of the handset housing is acoustically isolated from the microphone.

In addition, the sound-channeling means may be so shaped as to focus upon the microphone the sound which enters the interior of the housing through the entry means. This permits the telephone designer to lower the overall circuit gain for the purposes of noise reduction, without impairing the performance of the telephone link with respect to the desired acoustic signal.

In addition, the telephone assembly is of the type comprising a base unit adapted to be mounted upon a vertical wall and a handset adapted to be removeably and replaceably hung upon the base unit when the latter is in a vertical attitude. The sound channeling means comprises magnetically permeable means, and additional magnetically permeable means are mounted on the base unit. At least one of the magnetically permeable means comprises a permanent magnet, and the respective magnetically permeable means are positioned to magnetically attract each other when the handset is hung upon the wall-mounted base unit, thus biasing the handset toward the base unit. This makes the handset much more stable in its hung-up position In addition, the handset comprises telephone circuit means including a hang-up switch having an actuator button which is adapted and positioned to be depressed for the purpose of terminating a telephone call when pressed against a cooperating location on the base unit. The magnetically permeable means on the handset and the base unit are located sufficiently near the hang-up switch actuator button and the cooperating location respectively so that the magnetic attraction assists in depressing the hang-up switch actuator button when the handset is hung upon the base unit.

Preferably, the magnetically permeable means of the handset also comprises the sound-channelling means.

In addition, in the wall telephone assembly of this invention the base unit comprises a rear surface adapted to be placed in juxtaposed relation to the wall, a front surface adapted to face outwardly from the wall, and upperwardly facing support shelf means on the front surface of the base unit adapted to hang the handset therefrom. The handset comprises an inner surface adapted to confront the base unit when the handset is hung upon the support shelf means. There are downwardly facing hanger projection means on the inner surface of the handset adapted to rest upon the support shelf means for hanging the hand set therefrom. The support shelf means slope rearwardly and downwardly relative to the base unit and the hanger projection means slope inwardly and downwardly relative to the handset. As a result, when a downward force is exerted upon the handset, the interaction between the support shelf means and the hanger projection means tends to cam the handset toward the base unit to prevent dislodging of the handset from the base unit.

BRIEF DESCRIPTION OF THE DRAWINGS

These features and advantages of the invention will now be more fully described in connection with the following drawings.

DETAILED DESCRIPTION OF THE PREFERRED EMBODIMENT

Figure 1:
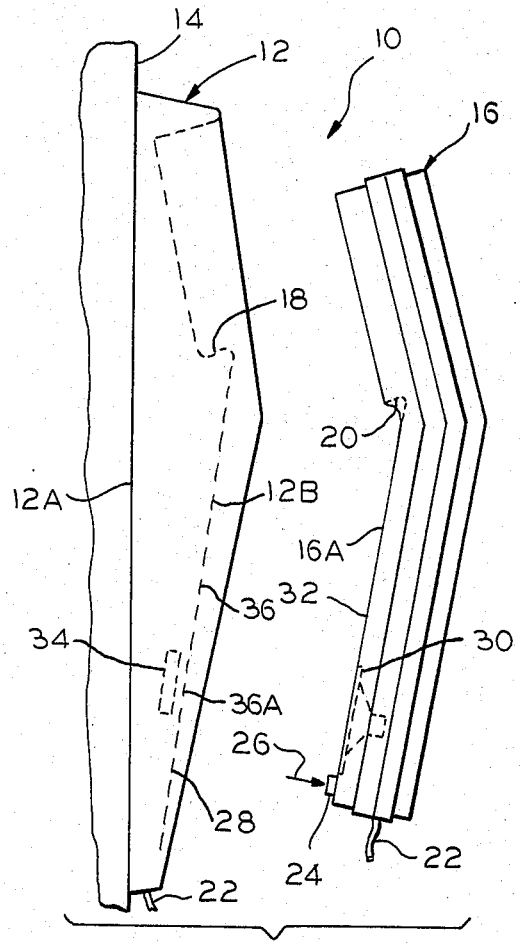
FIG. 1 is an exploded side elevational view of a wall-mounted telephone assembly in accordance with the present invention.
Figure 2:
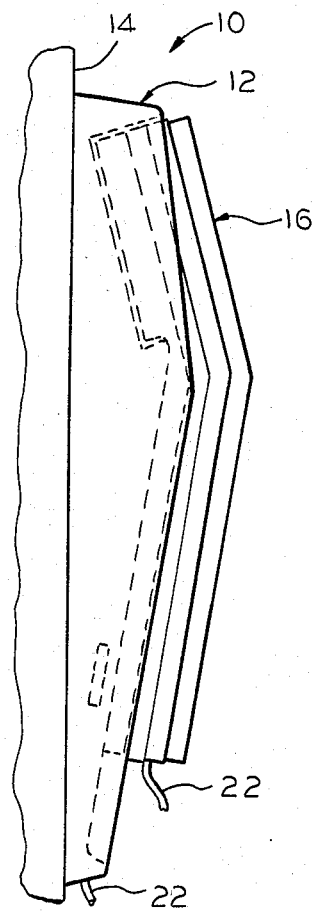
FIG. 2 is an assembled side elevational view of the same apparatus.
Figure 3:
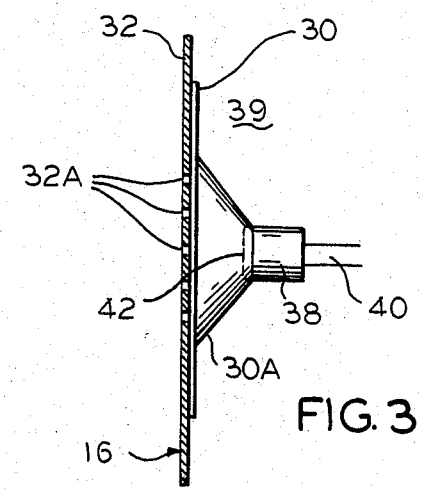
FIG. 3 is an enlarged side elevational detail view of the microphone subassembly of the above apparatus.
Figure 4:
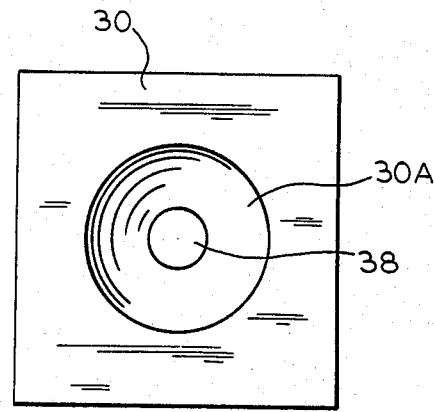
FIG. 4 is an enlarged front elevational detail view of the same microphone subassembly.

FIGS. 1 and 2 illustrate a wall-mounted telephone assembly, generally designated 10, which conventionally comprises two major components: a base unit generally designated 12 which is adapted to be mounted in the ordinary way in a vertical attitude upon a wall 14; and a handset generally designated 16 which is adapted to be removeably and replaceably hung upon the base unit. A back surface 12A of the base unit is in contact with the wall, and a front surface 12B faces outwardly from the wall. The handset must be removed from the base unit, as exemplified by FIG. 1, for the purpose of making a telephone call, after which it is hung upon the base unit in the manner exemplified by FIG. 2. The handset has an inner surface 16A which confronts the base unit outer surface 12B when the handset hangs upon the base unit in the manner illustrated.

In accordance with this invention, the front surface 12B of the base unit is formed with a generally upwardly facing support shelf 18, and the inner surface 16A of the handset is formed with a generally downwardly facing hanger projection 20, permitting the handset to be hung upon the base unit by engaging the downwardly facing hanger projection 20 of the handset downwardy against the upwardly facing support shelf 18 of the base unit. In order to assure that the handset is secure in that position, the support shelf 18 slopes downwardly and rearwardly relative to the base unit 12, while the hanger projection 20 slopes in the same direction (i.e. downwardly and inwardly towards the base unit) relative to the handset 16. As a result, any downward force exerted upon the handset 16, e.g. by gravity or by pulling upon the handset cord 22, will cause the shelf 18 to cam against the projection 20 in such a way as to exert a force upon the handset 16 which tends to pull it inwardly toward the base unit 12. This tends to make it substantially more difficult to unintentionally dislodge the handset from its hung-up position.

The handset 16 had a hang-up or hook switch, the actuator button 24 of which is visible in FIG. 1. This switch functions in the conventional manner to disconnect the telephone 10 from the telephone line when the actuator button 24 is depressed in the manner indicated by arrow 26. This switch actuator must be depressed by contact against the cooperating surface 28 of the base unit 12 in order to terminate the telephone line connection whenever the handset 16 is hung up on the base unit.

Since the vertical attitude of the wall-mounted assembly 10 prevents gravity from rendering any assistance in this regard, the present invention provides a magnetically permeable metallic plate 30 which is mounted in any convenient fashion against the inner surface of a portion of the wall of the housing 32 of the handset 16. The selected portion of the housing wall is adjacent the base unit 12 when the handset is hung up upon the latter. The magnetically permeable plate 30, which is preferably an alloy incorporating some ferrite material, cooperates with a permanent magnet 34 mounted in any convenient manner just inside the front wall 36 of the base unit 12 at a location 36A which is directly opposite some portion of the plate 30 when the handset 16 is hung up on the base unit. As a result, when the handset is hung up, the magnetic attraction exerted upon the plate 30 by the permanent magnet 34 pulls the lower end of the handset inwardly toward the base unit.

This has two highly desirable effects. First, the difficulty of accidentally dislodging the handset from its hung-up position is further increased; and second, the force exerted upon the hang-up switch actuator button 24 is substantially increased, thus assuring that the telephone line connection will be released when the handset is hung up.

Furthermore, in order to improve the acoustic characteristics of the telephone of this invention, the plate 30 serves a second purpose. A conventional condenser microphone 38 is mounted within the interior 39 of the hand set housing 32, and conventional perforations 32A are formed in the wall of that housing immediately in front of the microphone to admit sound waves. But the sensitivity of such microphones is such that when the sound waves reverberate inside the interior space 39, the microphone picks up a hollow, echo-like sound which is unpleasant to the hearer at the other end of the telephone link. In addition, when the telephone circuit gain is set at the levels which are normally required to amplify the desired acoustic signal, the condensor microphone 38 also picks up various extraneous background noises at sufficient amplitude levels to result in the reproduction of an undesireable amount of background noise at the other end of the telephone link.

Both of these problems are solved with a single stroke, by forming the plate 30 with a conical depression 30A which surrounds and tapers toward the micrphone 38. The microphone fits snugly inside an appropriately sized opening at the adjacent end of the conical depression, so as to communicate acoustically with the interior of the conical depression. Consequently, the conical depression acts as an acoustic guide which focusses and channels the desired sound of the telephone user's voice toward the microphone phone 38, and also acoustically isolates the microphone from the interior space 39 within the handset housing 32. The acoustic isolation effect is enhanced by a gasket 42 located inside the conical depression which surrounds the microphone 38.

This isolation effect prevents the microphone from picking up the sound reverberations which occur inside the interior space 39 of the handset housing 32. In addition, the focussing effect makes the microphone more sensitive to the desired sound of the telephone user's voice, so that a lower level of circuit gain can be employed, with the desireable result that the telephone link becomes less susceptible to extraneous background noises originating outside the housing 32.

The plate 30 therefore serves several functions at once. Acoustically it alleviates both the problem of internal reverberation and the problem of external noise; and mechanically it cooperates with the re-entrant surfaces 18 and 20 to increase the difficulty of accidentally dislodging the handset from its hung-up position upon the base unit, while also cooperating with the hang-up switch actuator button 24 to insure that the telephone line connection is cut off when the handset is hung up.

It will therefore be readily appreciated that the present invention substantially improves the mechanical stability of wall-mounted telephones, and the acoustic performance of telephones in general.

The foregoing detailed description specifies an embodiment which is presently preferred, and which serves to illustrate this invention. But other embodiments may be imagined now or in the future which may incorporate one or more aspects of the invention. Therefore the scope of protection accorded to this invention should not be limited to the particulars of this description, but instead should be determined by the following claims. These claims, moreover, should be interpreted consistently with the general principles and novel teachings expressed herein.

I claim:

1. A wall telephone assembly comprising:

a base unit adapted to be mounted upon a vertical wall; a handset adapted to be removeably and replaceably hung upon said base unit when the latter is in a vertical attitude;

said base unit including a rear surface adapted to be placed in juxtaposed relation to said wall, a front surface adapted to face outwardly from said wall, and upwardly facing support shelf means on said front surface of said base unit;

said handset including an inner surface adapted to confront said base unit, and downwardly facing hanger projection means on said inner surface of said handset;

said support shelf means sloping rearwardly and downwardly relative to said base unit when said handset is hung upon said support shelf means, said hanger projection means sloping inwardly and downwardly relative to said handset when said handset is hung upon said support shelf means, said support shelf means adapted to engage said hanger projection means when said handset is hung upon said support shelf means, whereby, when a downward force is exerted upon said handset, the interaction between said support shelf means and said hanger projection means tends to cam said handset inwardly and downwardly toward said base unit to prevent dislodging of said handset from said base unit;

said telephone assembly further including magnetically cooperating means on each said handset and said base unit, positioned to magnetically attract each other when said handset is hung upon said support shelf means, whereby to bias said handset toward said base unit;

said magnetic cooperating means in said handset providing focusing means shaped so as to intensify external sounds upon a microphone located in said handset.

2. Apparatus as in claim 1 wherein:

said handset comprises telephone circuit means including a hang-up switch including an actuator button located on said inner surface thereof which is adapted to be depressed for the purpose of terminating a telephone call when pressed against a cooperating location on said front surface of said base unit;

and said magnetically cooperating means on said handset and said base unit are located sufficiently near said hang-up switch and said cooperating location respectively so that said magnetic attraction assists in depressing said hang-up switch actuator button when said handset is hung upon said support shelf means.

3. A telephone assembly including a handset comprising:

a housing defining an interior, and entry means to admit sound to said interior;

a microphone mounted within said interior in position to detect sound entering therein;

an sound channeling means forming a substantially closed conical channel having a wide end and a narrow end for guiding sound from said entry means to said microphone, whereby to acoustically substantially isolate said microphone from said interior, said sound channeling means including means shaped so as to intensify upon said microphone the sound entering said interior through said entry means, said entry means provided by said wide end, said microphone provided at said narrow end;

wherein said telephone assembly is of the type comprising:

a base unit adapted to be mounted upon a vertical wall; and said handset adapted to be removably and replaceably hung upon said base unit when the latter is in a vertical attitude;

said sound channeling means including a first magnetically permeable means;

a second magnetically permeable means being mounted on said base unit;

at least one of said first and second magnetically permeable means including a permanent magnet; and each said magnetically permeable means positioned to magnetically attract each other when said handset is hung upon said support shelf means, whereby said handset is biased towards said base unit.

4. Apparatus as in claim 3 wherein:

said base unit includes a rear surface adapted to be placed in juxtaposed relationship to said wall, a front surface adapted to face outwardly from said wall, and an upwardly facing support shelf on said front surface of said base unit adapted to hang said handset therefrom;

said handset including an inner surface adapted to confront said base unit when said handset is hung upon said support shelf and a downwardly facing hanger projection on said inner surface of said handset adapted to rest upon said support shelf whereby said handset is hung thereupon said support shelf;

said support shelf sloping rearwardly and downwardly relative to said base unit and said hanger projection sloping inwardly and downwardly relative to said handset, said hanger projection cooperatingly engaging said support shelf, whereby, when a downward force is exerted upon said handset, an interaction between said support shelf means and said hanger projection means tends to cam said handset toward said base unit to prevent dislodging of said handset from said base unit.

5. A telephone assembly including a handset comprising:

a housing defining an interior, and entry means to admit sound to said interior;

a microphone mounted within said interior in position to detect sound entering therein;

and sound channeling means forming a substantially closed channel for guiding sound from said entry means to said microphone, whereby to acoustically substantially isolate said microphone from said interior;

a base unit adapted to be mounted upon a vertical wall;

said handset adapted to be removeably and replaceably hung upon said base unit when the latter is in a vertical attitude;
said sound channeling means including a first magnetically permeable means;
a second magnetically permeable means being mounted on said base unit;
at least one of said first and second magnetically permeable means including a permanent magnet;
each said magnetically permeable means positioned to magnetically attract each other when said handset is hung upon said support shelf means, whereby said handset is biased towards said base unit wherein
said handset comprises telephone circuit means including a hang-up switch having an actuator button which is adapted and positioned to be depressed for the purpose of terminating a telephone call when pressed against a cooperating location on said base unit;
and said magnetically permeable means on said handset and said base unit are located sufficiently near said hang-up switch actuator button and said cooperating location respectively so that said magnetic attraction assists in depressing said hang-up switch actuator button when said handset is hung upon said base unit.

6. A telephone assembly comprising:
a base unit adapted to be mounted upon a vertical wall;
a handset adapted to be removeably and replaceably hung upon said base unit when the latter is in a vertical attitude;
means on each said handset and said base unit positioned to magnetically attract each other when said handset is hung upon said base unit whereby to bias said handset toward said base unit;
said handset further comprising telephone circuit means including a hang-up switch having an actuator button which is adapted and positioned to be depressed for the purpose of terminating a telephone call when pressed against a cooperating location on said base unit when said handset is hung upon said base unit;
said magnetically cooperating means on said handset and said base unit being located sufficiently near said hang-up switch actuator button and said cooperating location respectively so that said magnetic attraction assists in depressing said hang-up switch actuator button when said handset is hung upon said base unit;
said handset including a housing defining an interior, and a microphone mounted within said interior of said housing; wherein
said magnetically cooperating means on said handset includes means for channeling sound from the exterior of said housing to said microphone.

* * * * *